R. B. TEWKSBURY.
THREAD FORMING TOOL.
APPLICATION FILED FEB. 13, 1911.
1,085,643.
Patented Feb. 3, 1914.
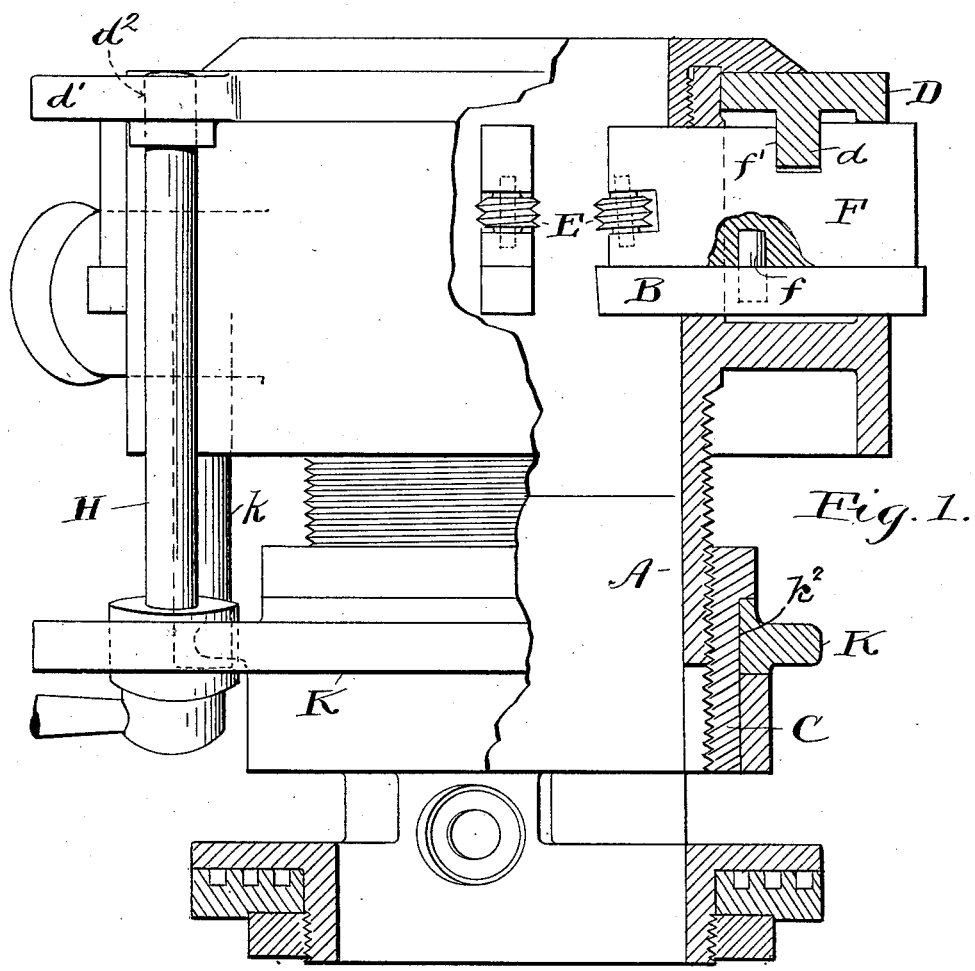
Fig. 1.
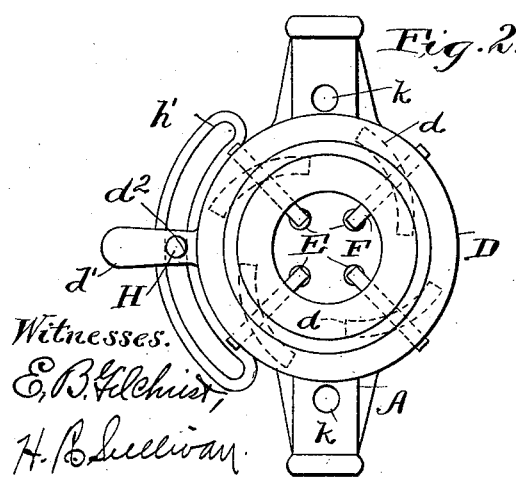
Fig. 2.
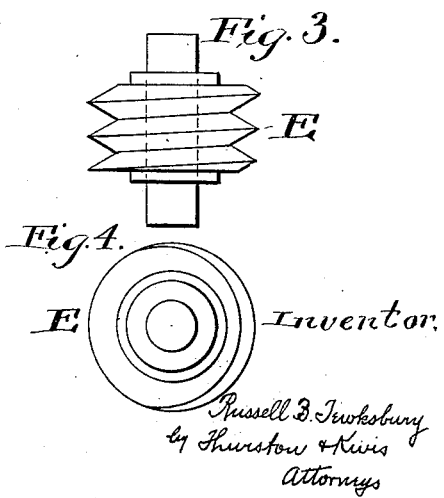
Fig. 3.
Fig. 4.
Witnesses.
E. B. Gilchrist,
H. B. Sullivan.
Inventor.
Russell B. Tewksbury
by Thurston & Kwis
Attorneys

UNITED STATES PATENT OFFICE.

RUSSELL B. TEWKSBURY, OF CLEVELAND, OHIO.

THREAD-FORMING TOOL.

1,085,643. Specification of Letters Patent. Patented Feb. 3, 1914.

Application filed February 13, 1911. Serial No. 608,296.

*To all whom it may concern:*

Be it known that I, RUSSELL B. TEWKSBURY, a citizen of the United States, residing at Cleveland, in the county of Cuyahoga and State of Ohio, have invented a certain new and useful Improvement in Thread-Forming Tools, of which the following is a full, clear, and exact description.

This invention relates to improvements in tools for threading cylindrical pieces of metal, and, more particularly, but not exclusively, for applying tapered threads to such cylindrical pieces of metal. My present opinion is that the said improvements will be most useful in a portable hand tool adapted for applying tapered threads to pipes intended for use as steam, gas or water pipes. It is to be understood, however, that said improvements are capable of embodiment in power driven tools, or in tools adapted to thread solid metal pieces as well as pipe, or to apply straight threads as well as tapered threads.

The invention in any embodiment requires a suitable tubular stock or head adapted to surround the work which is to be threaded, and capable of being rotated and moved longitudinally relative to the work. This stock must carry cutters adapted to trim down the work to the required size, and to taper it if required; and the head must also carry threading rollers, adapted to come into operation after the work has been turned down, for rolling the threads on the turned-off part of said work. It is also necessary that the tool be provided with means whereby the trimming cutters shall be withdrawn from contact with the work after they have served the purpose for which they are provided; and that said cutters be held in the withdrawn position while the threading rollers are doing their work. It is moreover desirable that the retraction of the cutters be automatic; and also that means be provided for adjusting the cutters and the threading rollers for operation upon the work of different diameters; and also that the tool be organized so that the stock as it is turned will advance longitudinally relative to the work at a required rate determined by the pitch of the threads to be applied. The tool shown in the drawing represents the best embodiment of the invention known to me and possesses all of the desirable attributes above mentioned. It is to be understood, however, that the appended claims are not to be understood as limited to this precise construction, or, in fact, to have any limitations in scope except as plainly expressed by their terms. This is because the fundamental invention is capable of embodiment in widely different specific forms, and because I desire that the invention as well as the specific form thereof shown in the drawing shall be covered by many of said claims.

Referring to the parts by letters, A represents the tubular stock or head which is provided with radial guideways in which are mounted cutters B.

C represents a tubular work holder of familiar form having a lead screw connection with the stock. The ends of the cutters B, which project into the tubular center of the stock, are fashioned like the cutting ends of lathe tools, so that they are adapted to turn off or trim the surface of any cylindrical piece of work with which they contact when the head is rotated relative to said work. These cutters are radially movable in said guideways, and their position is controlled by an adjuster D which is shown to be in the form of a cam plate which is rotatably mounted on the stock.

E, E represent threading rollers. Each of these rollers is mounted on the inner end of a radially movable roller carrier F which is preferably a rectangular bar adapted to move radially in the same grooves in which the cutters are movable. These threading rollers may be of any suitable construction, and their axes may be set in the required position relative to the axis of the stock to enable them to roll threads upon the work when the stock is rotated relative to the work. The permissible construction of threading rollers, and the manner in which their axes may be set relative to the work is well known in this art and require no description here. As shown in the drawing, the ribs on the rollers are arranged spirally, and their axes are inclined to correspond with the inclined surface of the work, but this is merely one of the well understood methods of making and setting such threading rollers. In the construction shown, each of these roller carriers F is interlocked with its associated cutter by means of a dowel pin $f'$, so that each roller carrier and its associated cutter must move radially in unison.

The cam plate D referred to has cam scrolls $d$ or ribs which enter notches $f$ in the roller carriers, whereby said roller carriers and cutters may move simultaneously inward or outward for adjustment or for other purposes, as hereinafter specified.

It is essential that, when the cutters shall have cut away enough of the "work," they shall withdraw to positions where they can no longer act upon it. Or, rather, it is essential that they shall be so withdrawn when they are arranged to turn the work to the required taper, or otherwise as the work moves relatively through the stock after said taper has been applied, the cutters will cut away the taper which they have formed. It is desirable that the cutters shall be withdrawn after they have trimmed enough of the work into cylindrical form, or otherwise they will be called upon to do unnecessary work after this has been accomplished. As stated, it is thought that this tool will be most useful in applying the tapered threads to work, and in that event of course the cutters will have to be arranged to turn the work down to the required tapered form. Preferably this will be accomplished most satisfactorily by means of cutters which are caused to gradually recede as they are turning down the work, said recession being at such rate that when the required length of the work has been tapered these cutters will be withdrawn so as to no longer engage with the work.

The receding mechanism shown is of familiar form, being substantially such as forms the subject matter of the Oster Patent No. 965,320. It consists of a ring K rotatable on the work holder, but with the stock. It is held against longitudinal movement on the work holder by being rotatably mounted in a circumferential groove $k^2$ thereon, and it carries pins $k$ parallel with the axis of the stock which slidingly enters holes in the stock, whereby said ring is compelled to turn with the stock, but the stock is permitted to move longitudinally relative to the ring. This ring carries a templet post H which is adjustably fixed to the ring in an arcual slot $h'$ formed therein, and passes through a hole $d^2$ in a lateral extension $d'$ of the cam plate. This post is inclined, provided it is desired to have the cam plate adjuster turned in the cutter receding direction while the stock is being turned. If, however, it was not desired to have the cutters recede, this post could be set with the axis of the stock. If it was desired to provide means by which, after the cutters had done their work, the adjuster could be quickly moved so as to withdraw the cutters, this templet post could be correspondingly shaped. It is to be understood, however, that this specific cutter receding mechanism is not essential to the invention. There are many well known mechanisms capable of being used which will either compel or permit the regulated slow recession of the cutters while the stock is being turned, or which will cause or permit a quick withdrawal of the cutters when they have finished their work, and any of such mechanisms may be substituted for the particular mechanism which is shown and which has been described.

In order to use the described tool, it is slipped over the end of the work to be threaded and the work holder clamped to the work. The positions of the cutters and roller carriers are then adjusted by means of the adjusting mechanism provided. Then the stock is turned, whereby it will rotate relative to the work, and will slowly move lengthwise relative to the work at a rate determined by the pitch of the lead screw connection between the work holder and the stock. It will be observed that the cutters and threading rollers are so placed that the former are nearer that end of the tool into which the work is introduced. The cutters will therefore first engage with and turn down the work to the required diameter and form. As stated, with the particular construction shown, the work is turned to the required tapered form, and the cutters slowly recede while this is being done. By continuing to turn the stock, the threading rollers are brought into engagement with the turned down part of the work, the roller carriers being so placed that the rollers will project sufficiently near to the axis of the stock to enable them to properly engage with the work. The continued rotation of the stock will cause these rollers to roll the thread upon the turned down part of the work, and the roller carriers will recede at a rate corresponding with the taper which has been put upon the work.

Having described my invention, I claim:

1. In a thread forming tool, the combination of a stock adapted to turn and move lengthwise relative to the work, trimming tools and roller carriers mounted upon said stock, threading rollers rotatably mounted on said roller carriers, said trimming tools being nearer than the rollers to that end of the stock into which the work is introduced, whereby the trimming tools trim down the work preparatory to the engagement of the rollers therewith, and means for withdrawing the trimming tools from contact with the work when they have trimmed it down to the extent desired.

2. In a thread forming tool, the combination of a work holder adapted to embrace and to be secured to the work, a tubular stock having a lead screw connection with said work holder, trimming tools and roller carriers mounted upon said stock, threading rollers mounted to rotate freely on said roller carriers, said trimming tools being nearer than the rollers to that end of the stock into which the work is introduced, whereby the trimming tools trim down the work preparatory to the engagement of the trimming tools therewith, and means for withdrawing the trimming tools from contact with the work when they have trimmed it down to the desired extent.

3. In a thread forming tool, the combination of a stock adapted to turn and move lengthwise relative to the work, adjustable trimming tools and adjustable roller carriers mounted upon said stock and adapted to be adjusted toward and from the axis of the stock, threading rollers rotatably mounted on said roller carriers, said trimming tools being nearer than the rollers to that end of the stock into which the work is introduced, whereby the trimming tools trim down the work preparatory to the engagement of the rollers therewith, and means for inducing simultaneous regulated slow outward recession of all the trimming tools as they are trimming down the work.

4. In a thread forming tool, the combination of a work holder adapted to embrace and be secured to the work, a tubular stock having a lead screw connection with said work holder, trimming tools and roller carriers mounted upon said stock and adapted to move in a substantially radial direction thereon, said trimming tools being nearer than the rollers to that end of the stock into which the work is introduced, whereby the trimming tools will trim down the work preparatory to the engagement of the rollers therewith, means connecting each trimming tool with its associated roller carrier, an adjuster adapted to adjust the position of said trimming tools and roller carriers, threading rollers mounted to rotate freely on the inner ends of said roller carriers, means for slowly moving the adjuster in the direction to cause the recession of the trimming tools and roller carriers while the work is being operated upon.

In testimony whereof, I hereunto affix my signature in the presence of two witnesses.

RUSSELL B. TEWKSBURY.

Witnesses:
E. L. THURSTON,
H. R. SULLIVAN.

Copies of this patent may be obtained for five cents each, by addressing the "Commissioner of Patents, Washington, D. C."